(12) United States Patent
Vasseur et al.

(10) Patent No.: US 11,398,958 B2
(45) Date of Patent: Jul. 26, 2022

(54) REVERTING ROUTING DECISIONS MADE BASED ON INCORRECT NETWORK PREDICTIONS

(71) Applicant: Cisco Technology, Inc., San Jose, CA (US)

(72) Inventors: Jean-Philippe Vasseur, Saint Martin D'uriage (FR); Grégory Mermoud, Venthône (CH); Vinay Kumar Kolar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 155 days.

(21) Appl. No.: 16/997,412

(22) Filed: Aug. 19, 2020

(65) Prior Publication Data
US 2022/0060393 A1 Feb. 24, 2022

(51) Int. Cl.
| | |
|---|---|
| *H04L 41/5009* | (2022.01) |
| *H04L 45/28* | (2022.01) |
| *H04L 67/02* | (2022.01) |
| *H04L 41/5022* | (2022.01) |
| *H04L 45/24* | (2022.01) |
| *H04L 41/5003* | (2022.01) |
| *H04L 45/00* | (2022.01) |
| *H04L 45/302* | (2022.01) |
| *H04L 43/08* | (2022.01) |
| *H04L 45/30* | (2022.01) |

(52) U.S. Cl.
CPC ...... *H04L 41/5009* (2013.01); *H04L 41/5003* (2013.01); *H04L 41/5022* (2013.01); *H04L 43/08* (2013.01); *H04L 45/22* (2013.01); *H04L 45/24* (2013.01); *H04L 45/28* (2013.01); *H04L 45/30* (2013.01); *H04L 45/302* (2013.01); *H04L 45/306* (2013.01); *H04L 67/02* (2013.01)

(58) Field of Classification Search
None
See application file for complete search history.

(56) References Cited

U.S. PATENT DOCUMENTS 9,813,259 B2 * 11/2017 Vasseur ............... H04L 47/25
9,838,317 B1 * 12/2017 Yadav ................ H04L 43/0829
(Continued)

OTHER PUBLICATIONS

U.S. Appl. No. 16/991,717, Unpublished (filed Aug. 12, 2020)., Cisco Technology Inc.
(Continued)

*Primary Examiner* — Lashonda T Jacobs
(74) *Attorney, Agent, or Firm* — Behmke Innovation Group LLC; Kenneth J. Heywood; Jonathon P. Western

(57) ABSTRACT

In one embodiment, a networking device reroutes traffic in a network from a first path to a second path, based on a prediction that the first path will not satisfy a service level agreement associated with the traffic. The networking device enters a fast monitoring state during which the networking device performs fast probing of the first path and of the second path onto which the traffic was rerouted. The networking device makes, based on the fast probing, a determination as to whether the first path would have violated the service level agreement and whether the second path violates the service level agreement. The networking device enacts a routing decision for the traffic by applying a routing policy to the determination.

20 Claims, 13 Drawing Sheets

(56) References Cited

U.S. PATENT DOCUMENTS

| | | | | |
|---|---|---|---|---|
| 10,511,507 | B2* | 12/2019 | Attarwala | H04L 45/123 |
| 10,771,375 | B2* | 9/2020 | Shah | H04L 45/745 |
| 10,880,203 | B2* | 12/2020 | Nainar | H04L 45/34 |
| 11,108,651 | B1* | 8/2021 | Mermoud | H04L 41/145 |
| 11,240,153 | B1* | 2/2022 | Vasseur | H04L 45/64 |
| 2008/0225713 | A1* | 9/2008 | Tychon | H04L 45/121 370/231 |
| 2015/0333953 | A1* | 11/2015 | Vasseur | H04L 47/127 370/228 |
| 2017/0353361 | A1 | 12/2017 | Chopra et al. | |
| 2018/0337992 | A1* | 11/2018 | Kurian | H04L 67/327 |
| 2019/0116485 | A1 | 4/2019 | Vasseur et al. | |
| 2020/0022016 | A1 | 1/2020 | Fenoglio et al. | |
| 2021/0014925 | A1* | 1/2021 | Li | H04L 47/78 |
| 2021/0336872 | A1* | 10/2021 | Singh | H04L 45/306 |
| 2021/0400029 | A1* | 12/2021 | Wang | H04L 63/18 |

OTHER PUBLICATIONS

Abdelkefi et al., "Assessing the service quality of an Internet path through end-to-end measurement", Computer Networks 70 (2014) 30-44.

Rifai et al., "PRoPHYS: Providing Resilient Path in Hybrid Software Defined Networks", [Research Report] I3S; CNRS; UCA. 2017, hal-01513875, 19 pages.

* cited by examiner

REVERTING ROUTING DECISIONS MADE BASED ON INCORRECT NETWORK PREDICTIONS

TECHNICAL FIELD

The present disclosure relates generally to computer networks, and, more particularly, to reverting routing decisions made based on incorrect network predictions.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs.

Failure detection in a network has traditionally been reactive, meaning that the failure must first be detected before rerouting the traffic along a secondary (backup) path. In general, failure detection leverages either explicit signaling from the lower network layers or using a keep-alive mechanism that sends probes at some interval T that must be acknowledged by a receiver (e.g., a tunnel tail-end router). Typically, SD-WAN implementations leverage the keep-alive mechanisms of Bidirectional Forwarding Detection (BFD), to detect tunnel failures and to initiate rerouting the traffic onto a backup (secondary) tunnel, if such a tunnel exits. While this approach is somewhat effective at mitigating tunnel failures in an SD-WAN, reactive failure detection is also predicated on a failure first occurring. This means that traffic will be affected by the failure, until the traffic is moved to another tunnel.

With the recent evolution of machine learning, predictive failure detection in an SD-WAN now becomes possible through the use of machine learning techniques. This provides for the opportunity to implement proactive routing whereby traffic in the network is rerouted before an SLA violation occurs. However, machine learning itself is not infallible. Thus, an incorrect prediction can lead to traffic being rerouted onto another path in the network, needlessly.

DESCRIPTION OF EXAMPLE EMBODIMENTS

Overview

Figure 1A:
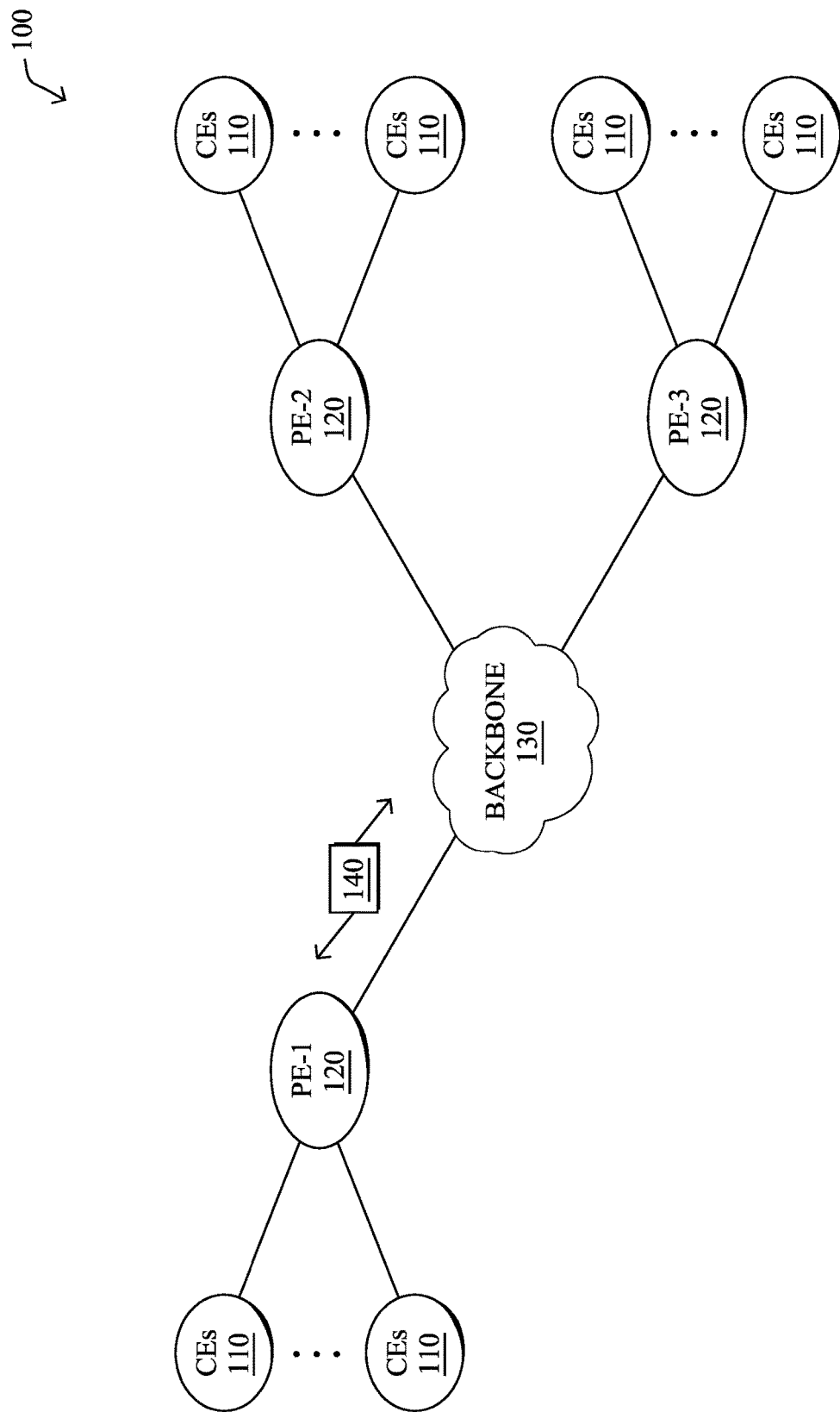
FIGS. 1A-1B illustrate an example communication network.

According to one or more embodiments of the disclosure, a networking device reroutes traffic in a network from a first path to a second path, based on a prediction that the first path will not satisfy a service level agreement associated with the traffic. The networking device enters a fast monitoring state during which the networking device performs fast probing of the first path and of the second path onto which the traffic was rerouted. The networking device makes, based on the fast probing, a determination as to whether the first path would have violated the service level agreement and whether the second path violates the service level agreement. The networking device enacts a routing decision for the traffic by applying a routing policy to the determination.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to pre-defined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
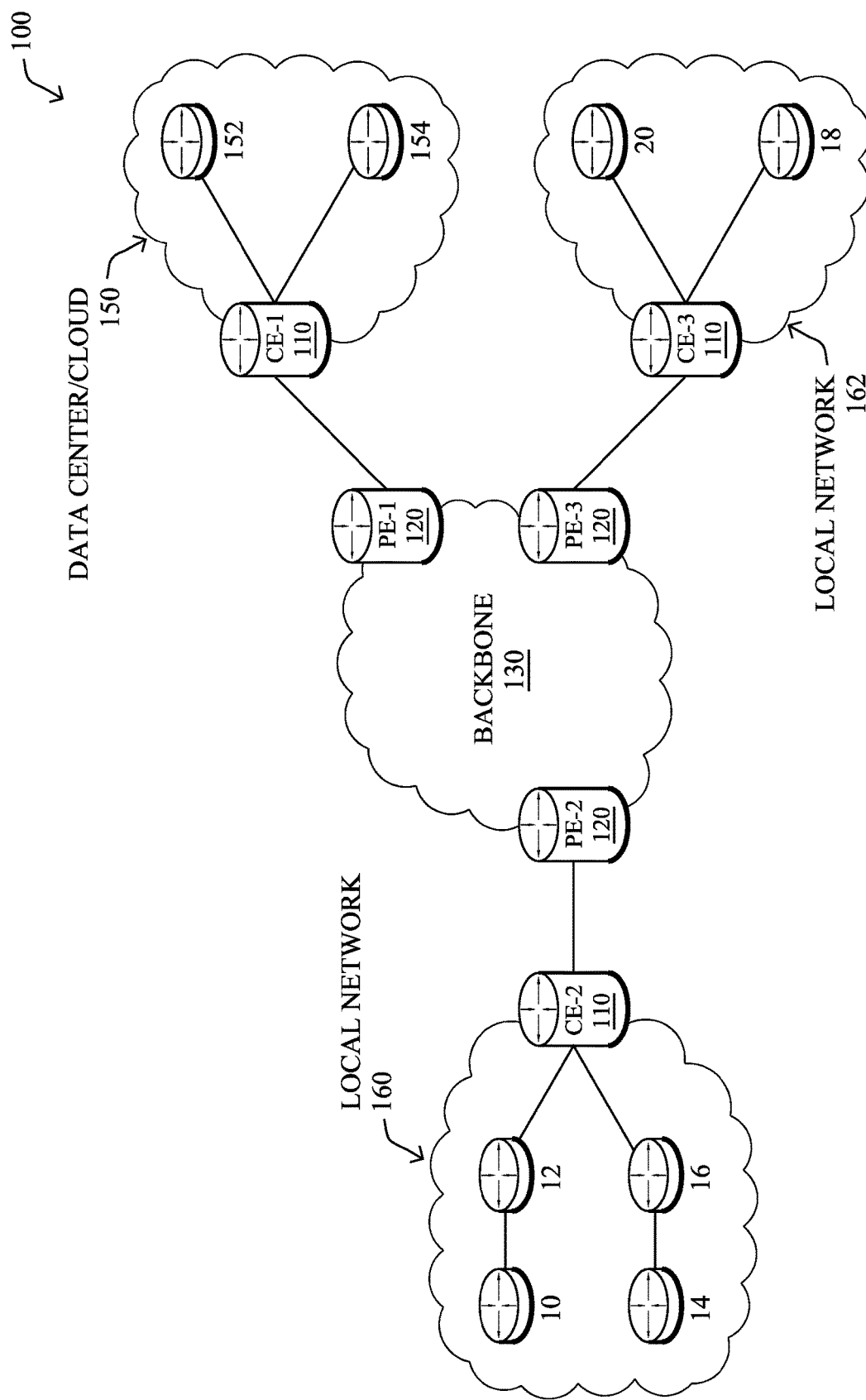

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
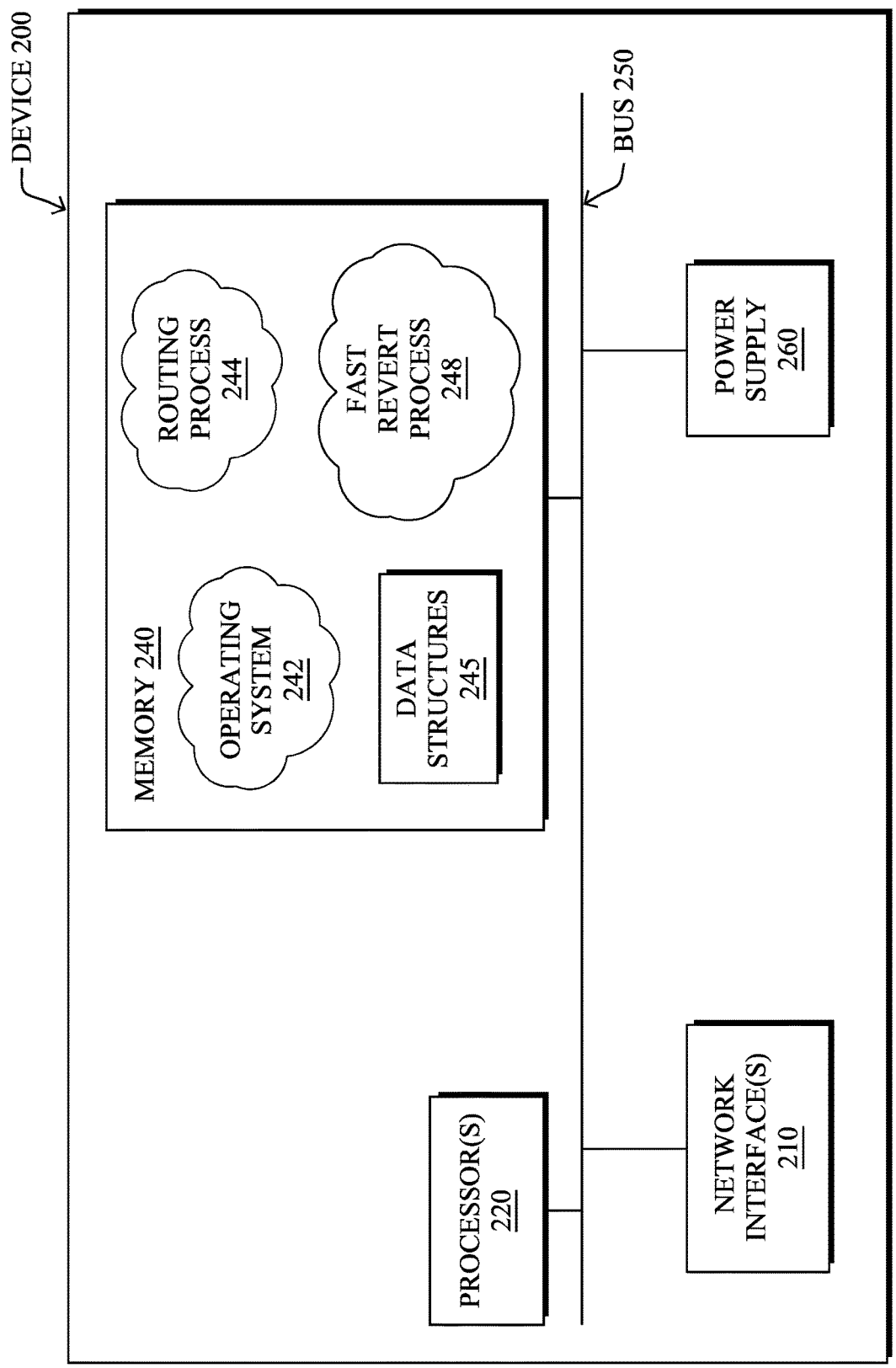
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a routing process 244 and/or a fast revert process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing process (services) 244 contains computer executable instructions executed by the processor 220 to perform functions provided by one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (i.e., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, routing process 244 and/or fast revert process 248 may also include computer executable instructions that, when executed by processor(s) 220, cause device 200 to perform the techniques described herein. To do so, in some embodiments, routing process 244 and/or fast revert process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, routing process 244 and/or fast revert process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as normal or anomalous. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that routing process 244 and/or fast revert process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted that conditions in the network will result in an SLA associated with traffic for a particular application will be violated. Conversely, the false negatives of the model may refer to the number of times the model incorrectly predicted that the SLA will not be violated. True negatives and positives may refer to the number of times the model correctly predicted whether the SLA will not be violated or will be violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different quality of service (QoS) at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
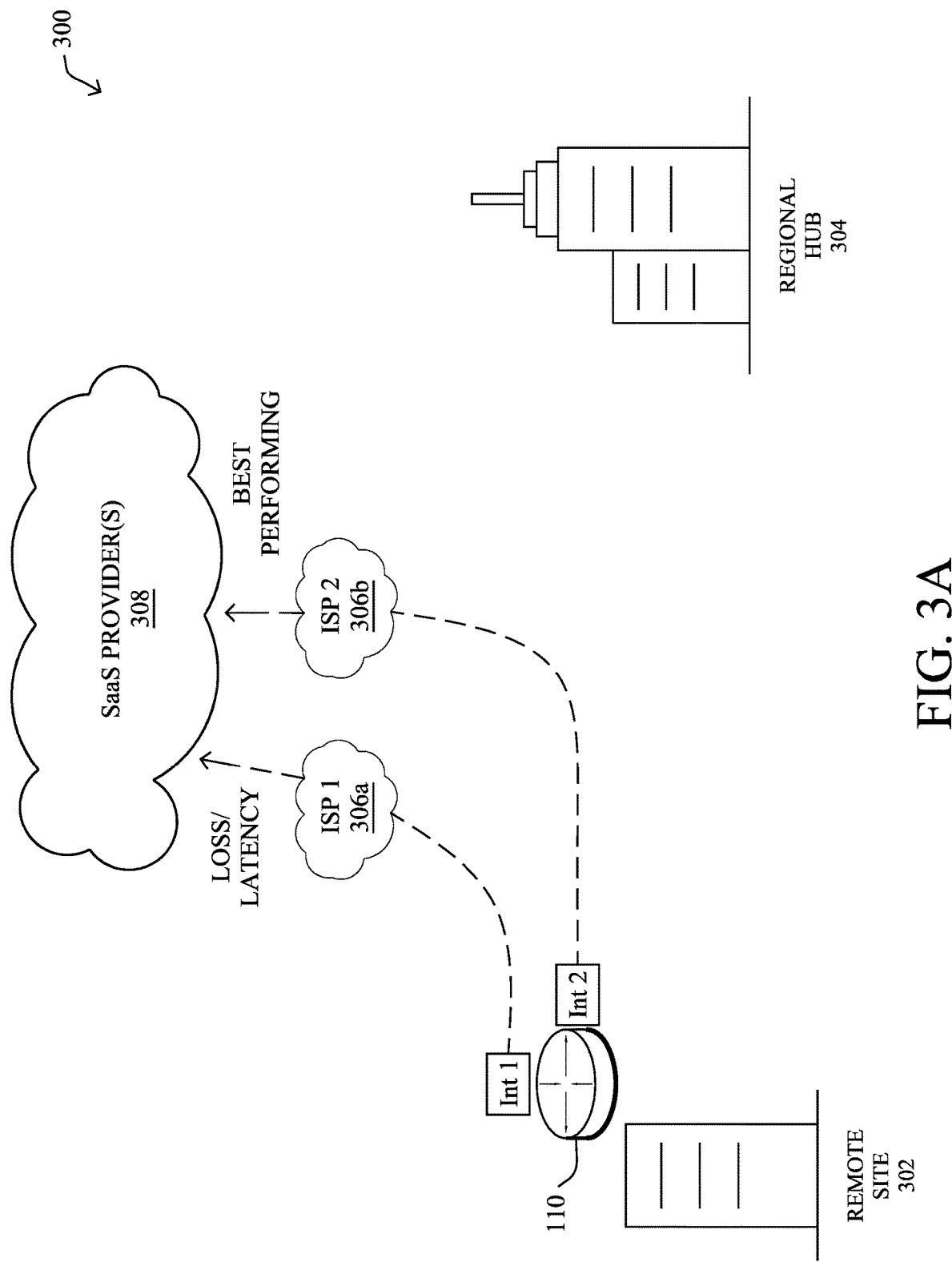
FIGS. 3A-3B illustrate example network deployments.
Figure 3B:
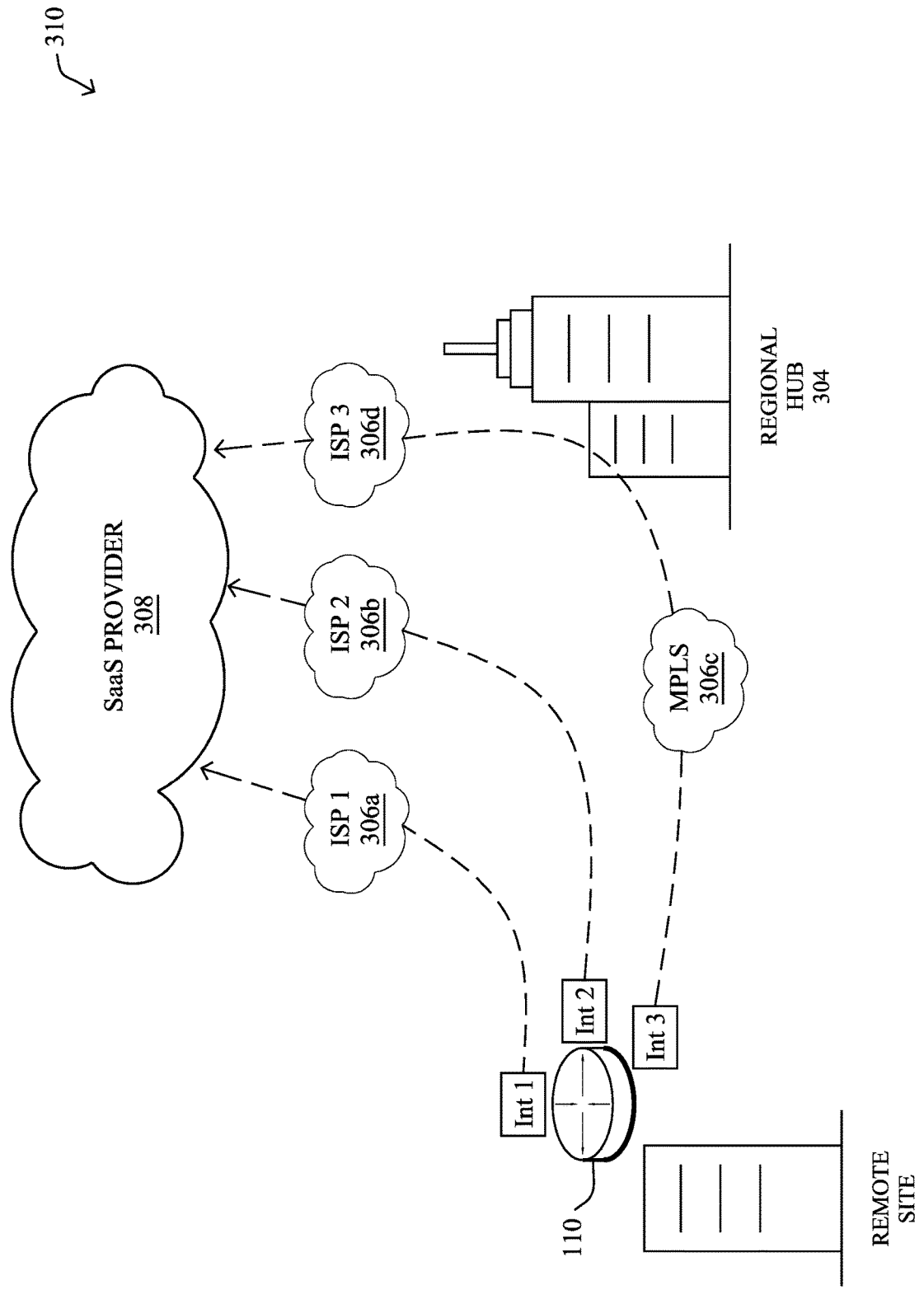

FIGS. 3A-3B illustrate example network deployments 300, 310, respectively. As shown, a router 110 (e.g., a device 200) located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
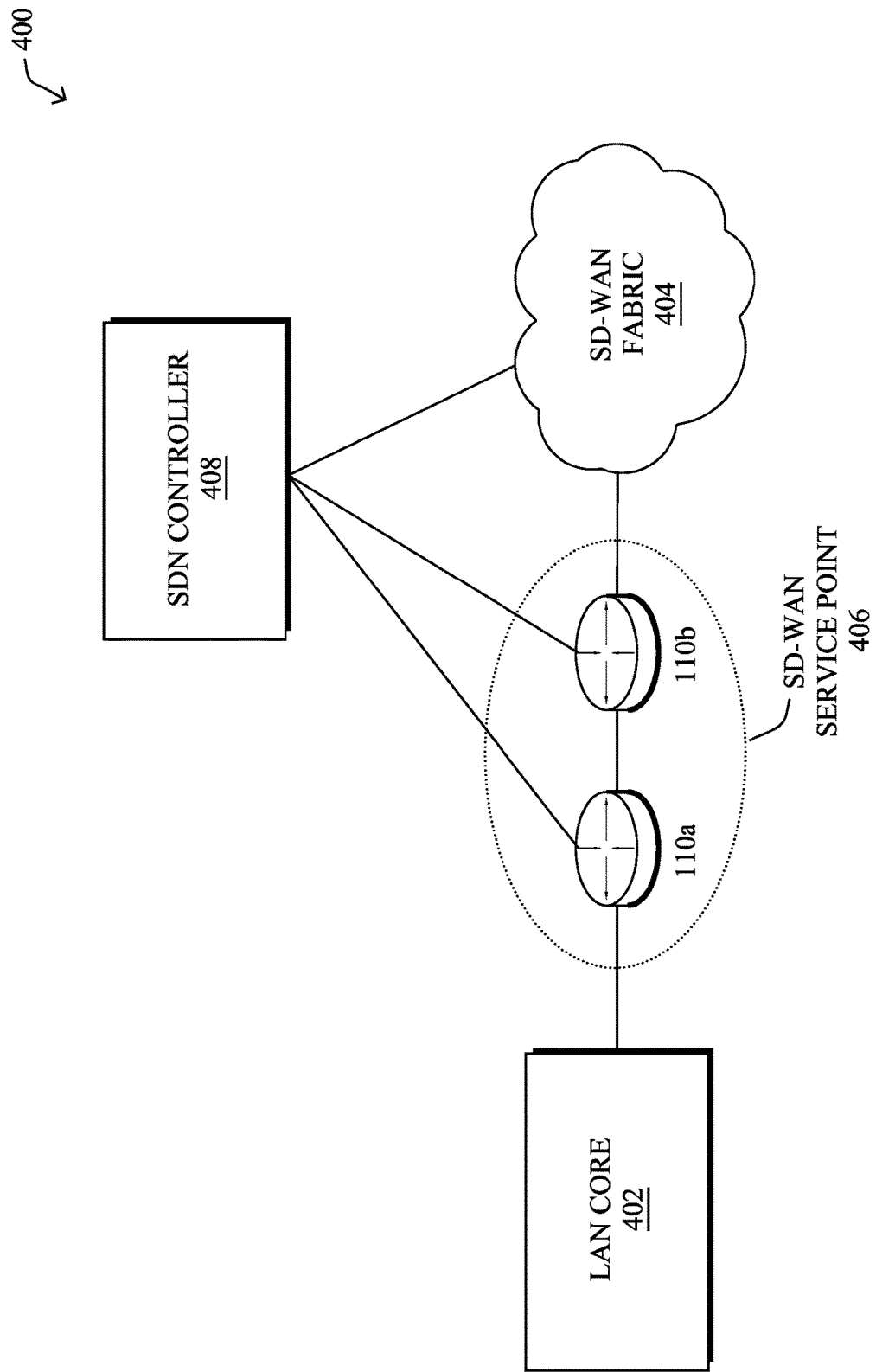
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., devices 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static; metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing s still entirely reactive: decisions are made using probes that reflect the status of a path at a given time, in contrast with the notion of an informed decision.

SLA failures are in the Internet and a good proportion of them could be avoided (using an alternate path), if predicted in advance.

Figure 4B:
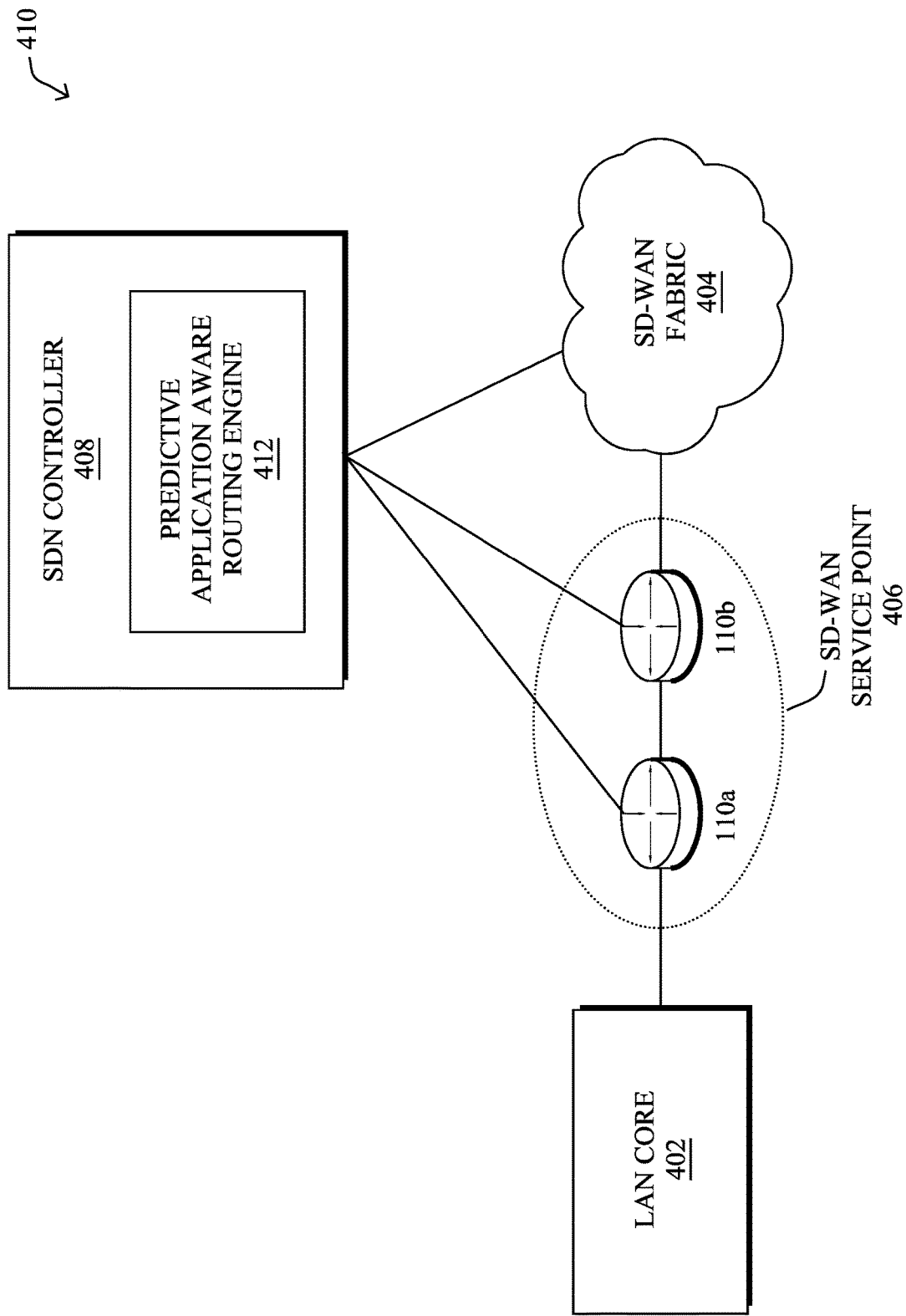

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of routing process 244 and/or fast revert process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110*a*-110*b*, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment.

Figure 5:
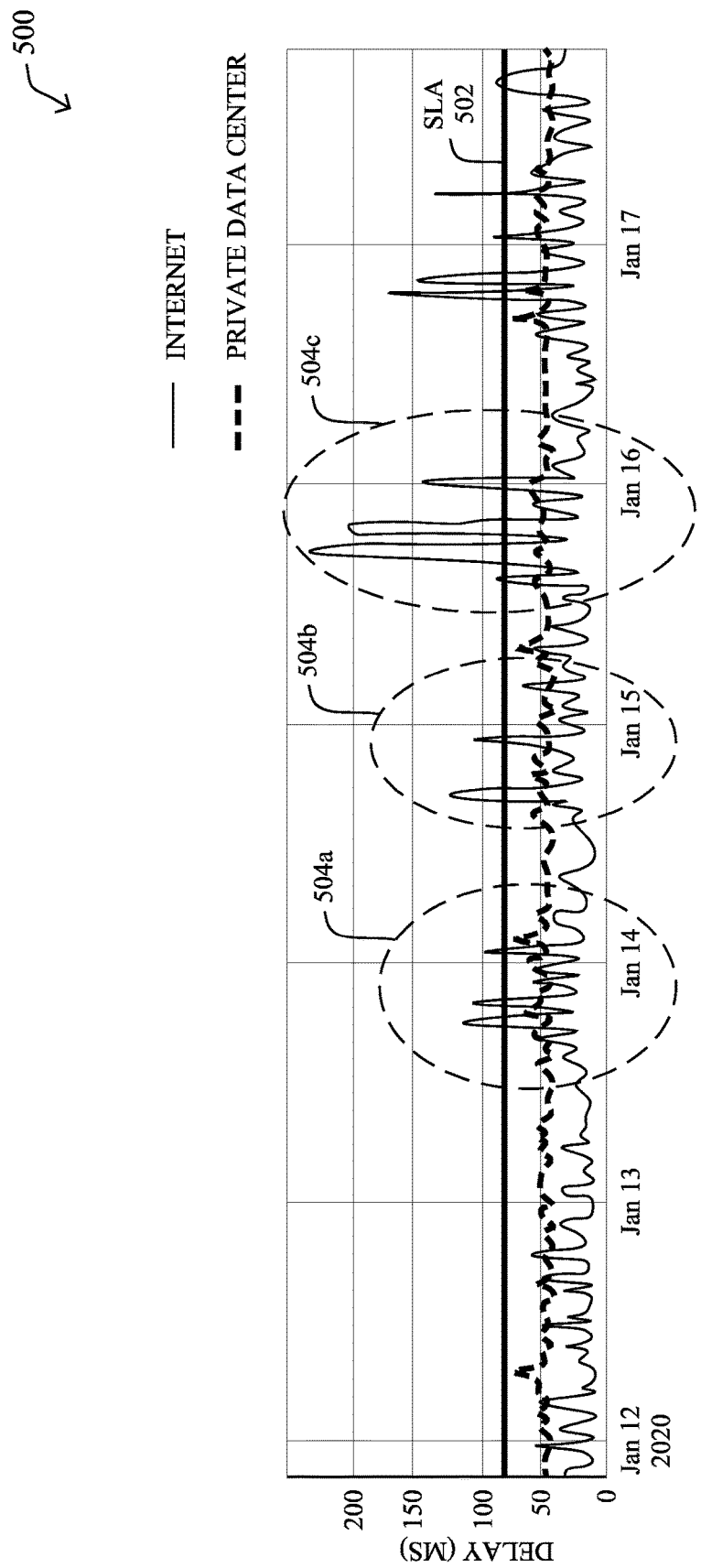
FIG. 5 illustrates an example plot of path delays over time.

By way of example, FIG. 5 illustrates a plot 500 of timeseries of delay observed by an edge device to reach a given destination via both the Internet (e.g., via a DIA connection) and a private data center (e.g., via traffic backhauling). Typically, the DIA connection provides the shortest delays to the destination. However, there are also times 504*a*-504*c* during which the backhauled connection via the private data center outperforms the DIA connection. Indeed, during times 504*a*-504*c*, the DIA connection exhibits spikes of delay, such that SLA 502 is violated.

As noted above, an application aware predictive routing engine may identify trend changes in the network KPIs of a path by utilizing several probes that measure path health (e.g., loss, latency and jitter). In turn, the predictive routing engine utilizes statistical and/or machine learning techniques to predict such path deterioration in the future (e.g., predict SLA violations) and generate routing "patches" (e.g., policies) that proactively reroute application traffic before an SLA violation occurs.

One of the main challenges of predictive routing is in the ability to accurately perform predictions of SLA violations. Generally speaking, the SLA violation predictions should be made with high recall, for the solution to be effective. However, recall is not the only consideration. Indeed, in some instances, it might also be acceptable not to predict an SLA violation and fall back to a reactive routing approach whereby SLAs are checked thanks to probing and the traffic is rerouted only when an actual SLA violation is detected.

Precision represents another performance metric for the SLA violation predictions, which can be particularly critical in situations in which the number of total positive examples is low (e.g., are rare events). Indeed, even a small number of false positives can strongly affect the precision, when the number of true positives is low. Furthermore, the traffic may be unnecessarily rerouted onto a path that may eventually not meet the SLA. In some embodiments, this can be mitigated against by also forecasting whether the new path will violate the SLA. However, rerouting traffic onto the new path will unavoidably change the conditions, including ways that could cause the SLA to be violated. This can be doubly problematic in situations in which the original path does not exhibit the predicted SLA violation, meaning that the predictive reroute actually made things worse.

Reverting Routing Decisions

The techniques introduced herein allow for the fast reversion of rerouting decisions on detection of a predictive routing engine incorrectly predicting an SLA violation on the primary/original path and/or traffic being rerouted onto a secondary/new path that results in a violation of the SLA. In some aspects, the techniques herein allow for a router to locally perform fast monitoring, so as to actively monitor the states of both path using various timing strategies. Then, on detection of an incorrect prediction or SLA violation on the secondary path, the rerouting decision can be quickly reverted, either by canceling the rerouting or performing another mitigation action, such as load balancing the traffic.

Illustratively, the techniques described herein may be performed by hardware, software, and/or firmware, such as in accordance with the fast revert process 248, which may include computer executable instructions executed by the processor 220 (or independent processor of interfaces 210) to perform functions relating to the techniques described herein (e.g., in conjunction with routing process 244).

Specifically, according to various embodiments, a networking device reroutes traffic in a network from a first path to a second path, based on a prediction that the first path will not satisfy a service level agreement associated with the traffic. The networking device enters a fast monitoring state during which the networking device performs fast probing of the first path and of the second path onto which the traffic was rerouted. The networking device makes, based on the fast probing, a determination as to whether the first path would have violated the service level agreement and whether the second path violates the service level agreement. The networking device enacts a routing decision for the traffic by applying a routing policy to the determination.

As pointed out previously, incorrectly predicting an SLA violation by a primary path can lead to its traffic being proactively rerouted onto a secondary path. If the predicted SLA violation was a false positive, this means that the traffic was rerouted without reason. Worse, rerouting is always a costly operation, from the back-head perspective. Furthermore, rerouting may disrupt some flows because of packet re-ordering and unavoidable increase of jitter. However, the false positive can have even worse effects, if the secondary path onto which the traffic is rerouted does not meet the SLA of the traffic.

Operationally, FIGS. 6A-6D illustrate the operation of a failsafe mechanism for predictive routing, according to various embodiments. As shown, assume that a network 600 includes a router 110c that is to send application traffic 608 to a destination 604, such as an SaaS provider or the like. To do so, there may be two or more possible routing paths between router 110c and destination 604. For instance, router 110c may be able to route application traffic 608 via one or more DIA connections, MPLS backhaul connections, or the like. For simplicity, two paths, path 602a and path 602b are shown.

In addition, there may also be a predictive routing engine 606 that uses telemetry data collected from network 600 to predict SLA violations along path 602a and path 602b and push routing patches to router 110c that cause router 110c to proactively avoid such violations by rerouting its traffic onto another path. For instance, as shown, assume that router 110c routes application traffic 608 via path 602a, which acts as the primary path for application traffic 608. Now, assume that predictive routing engine 606 predicts that path 602a will violate the SLA of application traffic 608. In such a case, application traffic 608 may generate and send a routing patch 610, so as to reroute application traffic 608 onto path 602b in advance of the predicted SLA violation by path 602a.

Figure 6A:
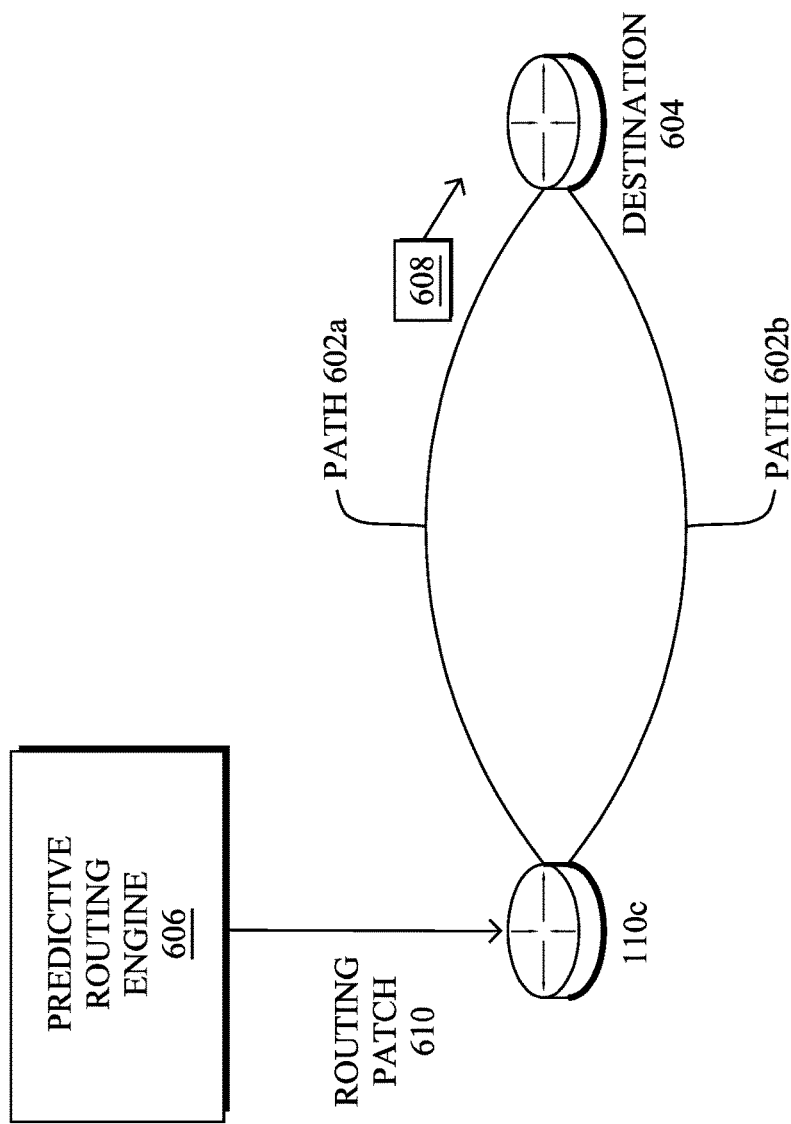
FIGS. 6A-6D illustrate an example of a failsafe mechanism for predictive routing in a network.
Figure 6B:
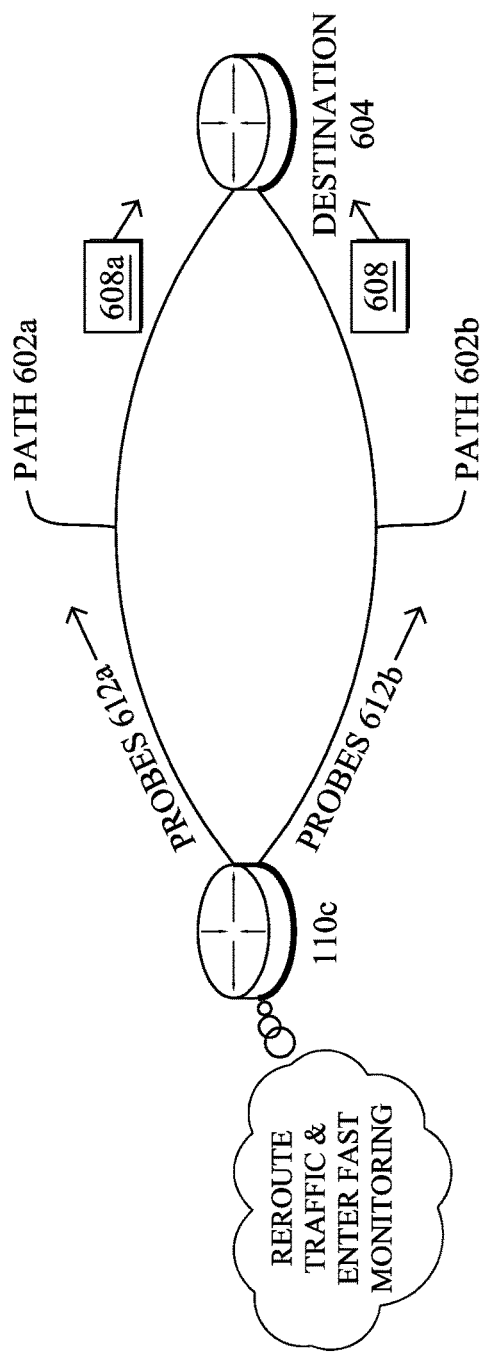

In FIG. 6B, after receiving routing patch 610, router 110c may reroute application traffic 608 onto the secondary path, path 602b, to avoid the predicted SLA violation by path 602a. According to various embodiments, router 110c may also enter into a Fast-Monitoring (FM) mode either before, shortly after, or concurrently with the rerouting of application traffic 608 onto path 602b at time according to routing patch 610 from predictive routing engine 606.

While in FM mode, router 110c may begin a fast probing cycle onto path 602a and path 602b whereby probes 612a and probes 612b, respectively, are sent. Such probes 612a-612b may be of different forms, depending on the natures of paths 602a-602b. For instance, probes 612a-612b may take the form of BFD probes on SD-WAN tunnels, HTTP probes for CloudOnRamp, etc. During this, router 110c may send probes 602a-602b every X-number of seconds where X<Y (Y being the default mode). In other words, router 110c may send probes along paths 602a-602b at a higher frequency while in FM mode than normally. In various embodiments, X could be computed taking into account the link speed, level of congestion, level of CPU usage, or other performance metrics for router 110c.

Based on the results of probing path 602a, router 110c may then perform local computations to check the SLA along path 602a. To this end, in some embodiments, predictive routing engine 606 may employ a custom extension to routing patch 610 that specifies the SLA template related to its rerouting prediction regarding path 602a (e.g., max delay, max loss, max jitter, etc.).

In a first embodiment, router 110c may switch application traffic 608 onto path 602b. However, in a further embodiment, router 110c may also send a local shadow copy of the packets of application traffic 608 as traffic copy 608a onto path 602a with a flag indicating to destination 604 or the tail-end of the tunnel that it should be dropped on reception. The aim of sending such a copy of application traffic 608 is to check whether the SLA would have been violated had the traffic stayed on path 602a, thus confirming whether the predicted SLA violation was a true positive or was incorrect (i.e., a false positive). Optionally, router 110c may send traffic copy 608a along path 602a for a shorter period of time, which may be configurable. In addition, router 110c may recolor as traffic copy 608a, to assign a lower priority to it, should other non-rerouted traffic still be sent along path 602a, to avoid QoS degradation of that traffic.

Router 110c may also perform fast probing of path 602b, potentially with a different probing interval X' than that of path 602a. In turn, router 110c may make local computations at a higher pace, to assess whether path 602b violates the SLA associated with application traffic 608. Optimally, a different statistical moment may also be used while router 110c is in FM mode. For instance, during normal operations, router 110c may usually check SLA violations during averages over ten-minute time periods. However, during FM mode, router 110c may check the SLA for violations at a much higher pace, such as every thirty seconds, using Max or higher percentile values.

In other embodiments, router 110c may monitor different application experience metrics, while in FM mode, in addition to any SLA violations. For example, router 110c may monitor the number of users affected by an SLA violation, the number of session disruptions, or even explicit application feedback information (e.g., degradation of video application traffic can be detected by changes in the resolution observed over paths).

Figure 6C:
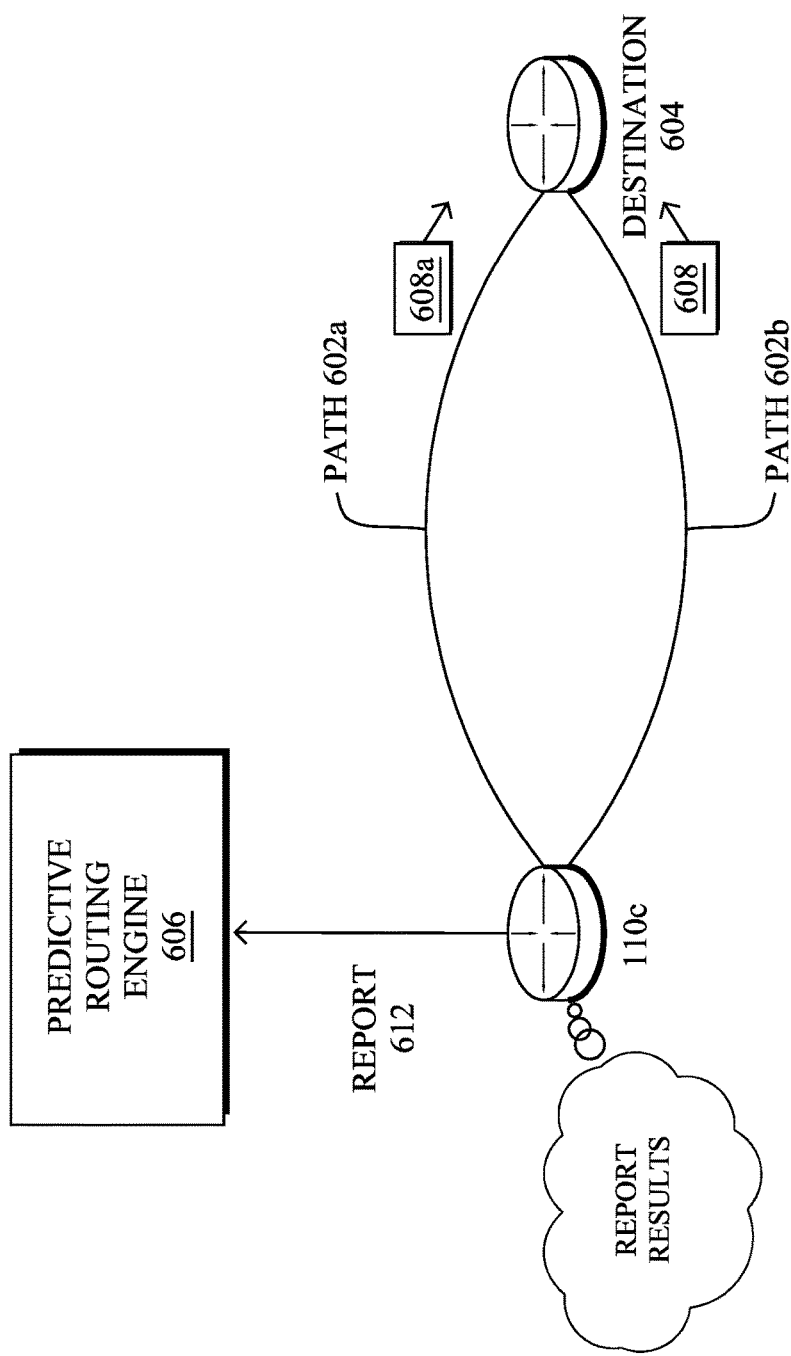

As shown in FIG. 6C, router 110c may send a report 612 to predictive routing engine 606 indicative of the results of its FM mode, according to various embodiments. For instance, report 612 may indicate whether the SLA was met or violated by path 602a or path 602b, whether a copy of traffic 608 was sent on path 602a, additional information related to the link status, queue status, application experience metrics, or the like. Predictive routing engine 606 may then use the information from report 612 in further predictions.

If the SLA of application traffic 608 was violated by path 602a, but not by path 602b, this is the ideal situation, meaning that predictive routing engine 606 correctly predicted that path 602a would violate the SLA of application traffic 608 and was able to trigger a reroute of traffic 608 onto path 602b, proactively. Conversely, if the SLA was not violated by either of paths 602a-602b, then application traffic 608 was unnecessarily rerouted but with (almost) no consequences. Finally, if the SLA was violated after rerouting application traffic 608 onto path 602b, but no such SLA violation would have occurred on path 602a, not only did predictive routing engine 606 make a wrong prediction (e.g., a false positive), but the decision to reroute application traffic 608 was also incorrect. Finally, if the SLA is violated on both paths 602a-602b, thanks to additional information obtained by router 110c from fast probing, predictive routing engine 606 may be able to determine whether the rerouting decision was still beneficial to application traffic 608 by comparing the SLA on path 602a and path 602b, especially in presence of traffic copy 608a on path 602a.

Another aspect of the techniques herein is a fast revertive mechanism, according to various embodiments. During its FM phase, which may be dynamic, router 110c may perform regular checks of the SLA with respect to paths 602a-602b at a regular time interval I. In turn, router 110c may enforce a revertive policy, based on the results of the checks. Such policies may be sent to router 110c by predictive routing engine 606 or another source, or configured directly on router 110c. For instance, the possible revertive policies may include any or all of the following:

SLA violated on path 602a and not on path 602b: Do nothing.

SLA violated on path 602b and not on path 602a: In this case, router 110c, if allowed, may trigger a revertive mode where the original application traffic 608 is switched back from path 602b to path 602a. In turn, router 110c may also notify predictive routing engine 606 of this revertive decision (e.g., via report 612 or another notification).

SLA not violated on path 602a or path 602b: Do nothing.

SLA violated on both path 602a and on path 602b: In this situation, router 110c may be allowed to perform load balancing on the rerouted application traffic 608 onto path 602a and path 602b, according to an approach governed by predictive routing engine 606 or locally configured on router 110c. In this case, router 110c may report its decision to predictive routing engine 606 (e.g., via report 612 or another notification). In addition, router 110c may continue to monitor the situation and send additional reports to predictive routing engine 606, along with optional parameters (e.g., Netflow parameters, queue statistics, etc.). Such information may further be used by predictive routing engine 606 to improve its predictions. In another embodiment, a further strategy may be to load balance application traffic 608 onto path 602a and path 602b, according to its traffic priority.

Figure 6D:
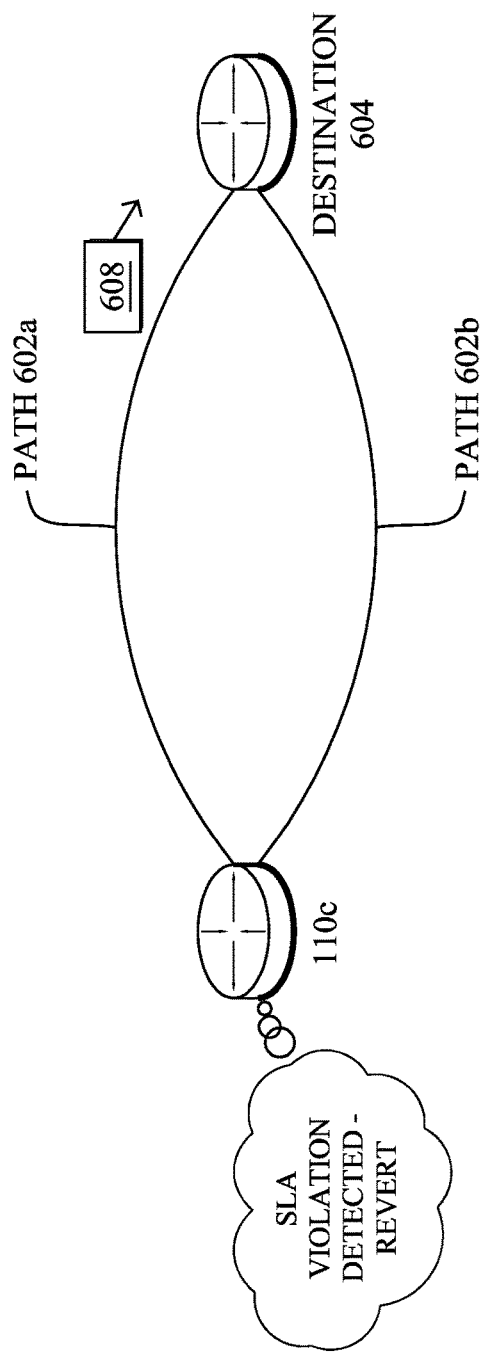

For instance, as shown in FIG. 6D, assume that the SLA was violated on path 602b, but not on path 602a. In such a case, router 110c may revert the reroute of predictive routing engine 606 from path 602b back onto path 602a.

In yet another embodiment, router 110c may be allowed to perform additional trials. Under this, even if application traffic 608 is switched back to the primary path, path 602a, router 110c may continue to record local conditions and may make a second rerouting attempt to move application traffic 608 back onto path 602b, if the total rerouting period has not yet expired. For example, assume that router 110c determines that the link utilization suddenly decreases or had suddenly increased, prior to time $T_1$ (e.g., when the SLA violation was predicted to occur). That may be due, for instance, to unexpected traffic being sent via path 602b, prior to the rerouting of application traffic 608. In such a case, router 110c may make a second attempt to reroute application traffic 608 onto path 602b and report the results of this to predictive routing engine 606. Optionally, router 110c may perform a set of N-number attempts for the reroute, each attempt being evenly spread out in time or, alternatively, separated by increasing periods of time (e.g., using dampening).

In yet another embodiment, the data from the N-number of rerouting attempts by router 110c may be analyzed statistically, to check whether rerouting onto path 602b is in fact significantly better than path 602a in terms of SLA violation. For example, router 110c may record the fraction of time the SLA is violated on path 602a and on path 602b for the N-number of attempts. Then, a statistical hypothesis test, such as Two sample Kolmogorov-Smirnov (KS)-Test, can be performed to check whether the above conditions can be inferred (e.g., SLA violated on path 602a, and not on path 602b).

Note that traditional routing approaches such as ISIS, OSPF, etc., or even MPLS TE Fast Reroute where tunnel head-ends are rerouted onto the primary path upon global re-optimization, lack any form of revertive operation.

In further embodiments, predictive routing engine 606 may use any reports of false positives by router 110c to improve the prediction accuracy of its model. Optionally, a report of a false positive by router 110c may even trigger model retraining.

In addition, the false positive rate can also be used to adjust the revertive mode described previously. For instance, if the false positive rate increases, predictive routing engine 606 may adjust the FM period of router 110c, such as by using a shorter interval between probing or a shorter period of time I to decide whether to revert. Conversely, if the false positive rate decreases, meaning that the performance of the prediction model actually increased, predictive routing engine 606 may opt to increase either or both of these periods of time on router 110c. Similarly, predictive routing engine 606 may use metrics such as the rate of SLA violations on path 602b and not on path 602a, to adapt the policy and potentially reduce the ability of the system for the automation of rerouting. Indeed, if the predictions by predictive routing engine 606 are incorrect and traffic is rerouted onto a secondary path resulting in an SLA violation, it may be desirable to restrict the ability for the system to perform close loop control, in some embodiments. Note also that the additional information provided by router 110c on the status along path 602b when rerouting application traffic 608 may be used by predictive routing engine 606 its choice of alternate path for further rerouting decisions, when it forecasts SLA violations along the primary path 602a (e.g., by opting to reroute further traffic along a third path instead of path 602b, etc.).

Figure 7:
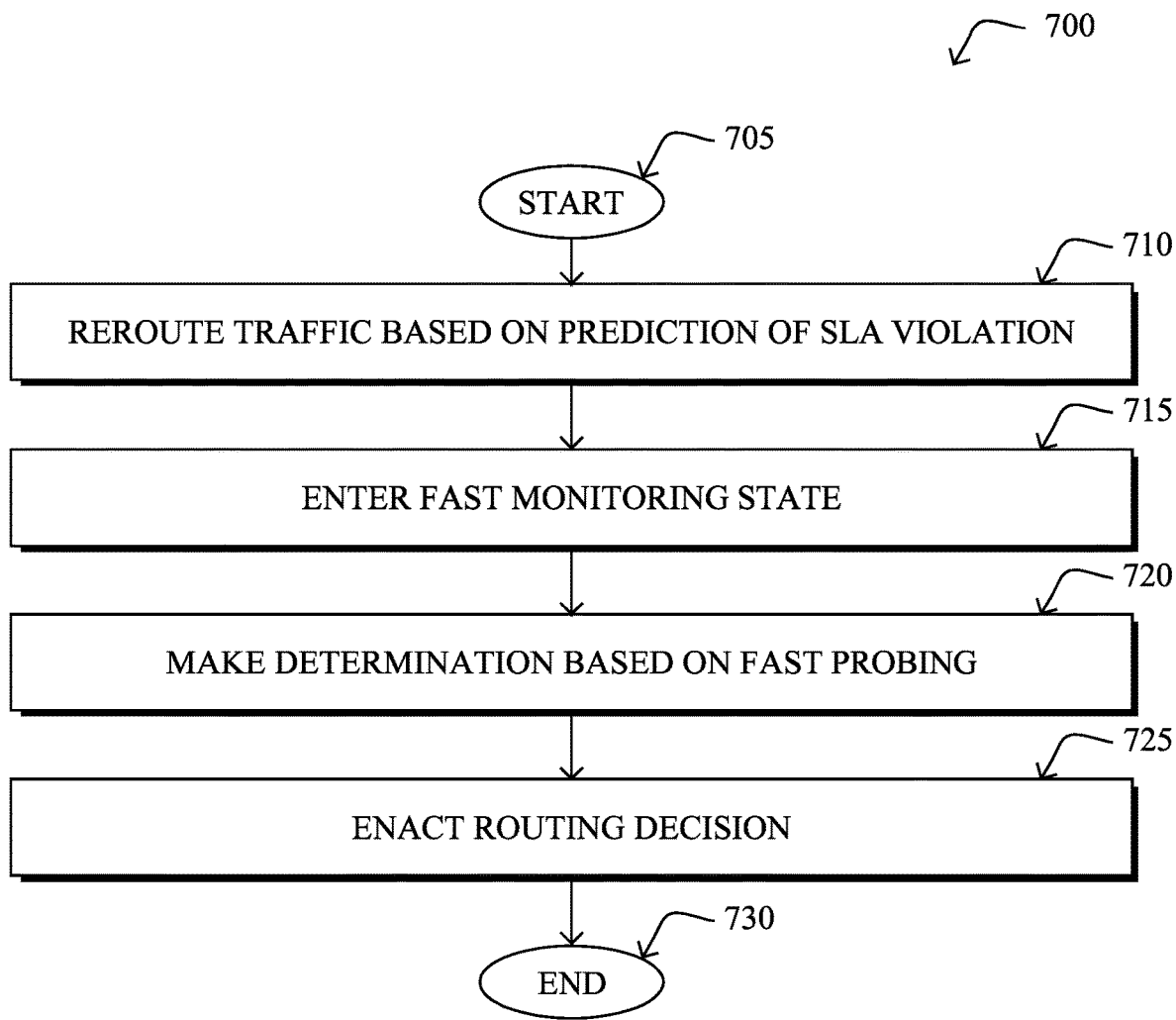
FIG. 7 illustrates an example simplified procedure to perform fast probing for a predictive routing decision.

FIG. 7 illustrates an example simplified procedure to perform fast probing for a predictive routing decision, in accordance with one or more embodiments described herein. For example, a non-generic, specifically configured device (e.g., device 200), such as a networking device (e.g., a router, an SDN controller for an SD-WAN, etc.), may perform procedure 700 by executing stored instructions (e.g., process 248). The procedure 700 may start at step 705, and continues to step 710, where, as described in greater detail above, the networking device may reroute traffic in a network from a first path to a second path, based on a prediction that the first path will not satisfy a SLA associated with the traffic. For instance, a machine learning-based predictive routing engine, either locally on the networking device or remote to it, may make the prediction.

At step 715, as detailed above, the networking device may enter a fast monitoring state during which the networking device performs fast probing of the first path and of the second path onto which the traffic was rerouted, as described in greater detail above. In general, the fast probing may comprise sending probes along the first path and along the second path at a faster rate than a default probing rate used by the networking device. For instance, the networking device may send BFD probes, HTTP probes, or the like, along the first and second paths, to assess their performance metrics. In yet another embodiment, the fast probing may comprise sending a copy of the traffic along the first path with a flag indicating that the copy of the traffic should be dropped upon reception.

At step 720, the networking device may make, based on the fast probing, a determination as to whether the first path would have violated the SLA and whether the second path violates the SLA, as described in greater detail above. In one embodiment, the determination indicates that the first path would not have violated the SLA and that the second path does violate the SLA. In another embodiment, the determination indicates that the first path would have violated the SLA and that the second path does not violate the SLA. In a further embodiment, the determination indicates that the first path would have violated the SLA and that the second path does violate the SLA.

At step 725, as detailed above, the networking device may enact a routing decision for the traffic by applying a routing policy to the determination. In one embodiment, the device may do so by rerouting the traffic back onto the first path, as in the case where the determination indicates that the first path would not have violated the SLA and that the second path does violate the SLA. In such cases, the networking device may notify a machine learning-based predictive routing engine that made the prediction that the first path will not satisfy the SLA, of the determination, to improve prediction accuracy of the machine learning-based predictive routing engine. In further embodiments, the networking device may also perform a second attempt to reroute the traffic onto the second path, so as to perform an additional trial of the second path. the In another embodiment, the device may enact the routing decision by keeping the traffic on the second path, as in the case in which the determination indicates that the first path would have violated the SLA and that the second path does not violate the service level agreement. In yet another embodiment, the networking device may enact the routing decision by load balancing the traffic between the first path and the second path, as in the case in which the determination indicates that the first path would have violated the service level agreement and that the second path does violate the service level agreement. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce a safeguard mechanism for predictive routing deployments in a network. By fast probing network paths involved in a predictive routing decision, corrective measure can be taken quickly, to mitigate any harm caused by false positives. In further aspects, a feedback loop with the predictive routing engine can also be used, to help improve the prediction accuracy of it over time.

While there have been shown and described illustrative embodiments that provide for reverting routing decisions made based on incorrect network predictions, it is to be understood that various other adaptations and modifications may be made within the spirit and scope of the embodiments herein. For example, while certain embodiments are described herein with respect to using certain models for purposes of predicting tunnel failures, SLA violations, or the like, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   rerouting, by a networking device, traffic in a network from a first path to a second path, based on a prediction that the first path will not satisfy a service level agreement associated with the traffic;
   entering, by the networking device, a fast monitoring state during which the networking device performs fast probing of the first path and of the second path onto which the traffic was rerouted;
   making, by the networking device and based on the fast probing, a determination as to whether the first path would have violated the service level agreement and whether the second path violates the service level agreement; and
   enacting, by the networking device, a routing decision for the traffic by applying a routing policy to the determination.

2. The method as in claim 1, wherein the network comprises a software-defined wide area network (SD-WAN) and wherein the first path and the second path comprise network tunnels.

3. The method as in claim 1, wherein the fast probing comprises sending probes along the first path and along the second path at a faster rate than a default probing rate used by the networking device.

4. The method as in claim 1, wherein performing fast probing of the first path and of the second path comprises send Bidirectional Forwarding Detection (BFD) probes or Hypertext Transfer Protocol (HTTP) probes.

5. The method as in claim 1, wherein the determination indicates that the first path would not have violated the service level agreement and that the second path does violate the service level agreement, and wherein enacting the routing decision comprises:
   rerouting the traffic back onto the first path.

6. The method as in claim 5, further comprising:
   notifying a machine learning-based predictive routing engine that made the prediction that the first path will not satisfy the service level agreement of the determination, to improve prediction accuracy of the machine learning-based predictive routing engine.

7. The method as in claim 5, further comprising:
   performing a second attempt to reroute the traffic onto the second path.

8. The method as in claim 1, wherein the determination indicates that the first path would have violated the service level agreement and that the second path does not violate the service level agreement, and wherein enacting the routing decision comprises:
keeping the traffic on the second path.

9. The method as in claim 1, wherein the determination indicates that the first path would have violated the service level agreement and that the second path does violate the service level agreement, and wherein enacting the routing decision comprises:
load balancing the traffic between the first path and the second path.

10. The method as in claim 1, wherein the fast probing comprises sending a copy of the traffic along the first path with a flag indicating that the copy of the traffic should be dropped upon reception.

11. An apparatus, comprising:
one or more network interfaces;
a processor coupled to the one or more network interfaces and configured to execute one or more processes; and
a memory configured to store a process that is executable by the processor, the process when executed configured to:
reroute traffic in a network from a first path to a second path, based on a prediction that the first path will not satisfy a service level agreement associated with the traffic;
enter a fast monitoring state during which the apparatus performs fast probing of the first path and of the second path onto which the traffic was rerouted;
make, based on the fast probing, a determination as to whether the first path would have violated the service level agreement and whether the second path violates the service level agreement; and
enact a routing decision for the traffic by applying a routing policy to the determination.

12. The apparatus as in claim 11, wherein the network comprises a software-defined wide area network (SD-WAN) and wherein the first path and the second path comprise network tunnels.

13. The apparatus as in claim 11, wherein the fast probing comprises sending probes along the first path and along the second path at a faster rate than a default probing rate used by the apparatus.

14. The apparatus as in claim 11, wherein performing fast probing of the first path and of the second path comprises send Bidirectional Forwarding Detection (BFD) probes or Hypertext Transfer Protocol (HTTP) probes.

15. The apparatus as in claim 11, wherein the determination indicates that the first path would not have violated the service level agreement and that the second path does violate the service level agreement, and wherein the apparatus enacts the routing decision by rerouting the traffic back onto the first path.

16. The apparatus as in claim 15, wherein the process when executed is further configured to:
notify a machine learning-based predictive routing engine that made the prediction that the first path will not satisfy the service level agreement of the determination, to improve prediction accuracy of the machine learning-based predictive routing engine.

17. The apparatus as in claim 15, wherein the process when executed is further configured to:
perform a second attempt to reroute the traffic onto the second path.

18. The apparatus as in claim 11, wherein the determination indicates that the first path would have violated the service level agreement and that the second path does not violate the service level agreement, and wherein the apparatus enacts the routing decision by keeping the traffic on the second path.

19. The apparatus as in claim 11, wherein the determination indicates that the first path would have violated the service level agreement and that the second path does violate the service level agreement, and wherein enacting the routing decision by load balancing the traffic between the first path and the second path.

20. A tangible, non-transitory, computer-readable medium storing program instructions that cause a networking device to execute a process comprising:
rerouting, by the networking device, traffic in a network from a first path to a second path, based on a prediction that the first path will not satisfy a service level agreement associated with the traffic;
entering, by the networking device, a fast monitoring state during which the networking device performs fast probing of the first path and of the second path onto which the traffic was rerouted;
making, by the networking device and based on the fast probing, a determination as to whether the first path would have violated the service level agreement and whether the second path violates the service level agreement; and
enacting, by the networking device, a routing decision for the traffic by applying a routing policy to the determination.

\* \* \* \* \*

UNITED STATES PATENT AND TRADEMARK OFFICE
CERTIFICATE OF CORRECTION

| | | |
|---|---|---|
| PATENT NO. | : 11,398,958 B2 | |
| APPLICATION NO. | : 16/997412 | |
| DATED | : July 26, 2022 | |
| INVENTOR(S) | : Jean-Philippe Vasseur et al. | |

It is certified that error appears in the above-identified patent and that said Letters Patent is hereby corrected as shown below:

In the Specification

Column 8, Line 60, please amend as shown:
loss, latency, etc.), but each time with a static metric. At Column 9, Line 16, please amend as shown:
Routing is still entirely reactive: decisions are made using Column 9, Line 19, please amend as shown:
SLA failures are very common in the Internet and a good proportion of Column 9, Line 20, please amend as shown:
them could be avoided (e.g., using an alternate path), if Column 10, Line 14, please amend as shown:
One of the main challenges of predictive routing lies in the Column 10, Line 33, please amend as shown:
path will unavoidably change the conditions, including in ways Column 11, Line 47, please amend as shown:
tion traffic 608 onto path 602b at time $T_1$, according to routing Signed and Sealed this
Twenty-fifth Day of October, 2022

Katherine Kelly Vidal
*Director of the United States Patent and Trademark Office*